(12) United States Patent
Maier et al.

(10) Patent No.: US 8,505,379 B2
(45) Date of Patent: Aug. 13, 2013

(54) METHOD FOR PRODUCING A SENSOR SYSTEM, AND SENSOR SYSTEM

(75) Inventors: Viktor Maier, Vienna (AT); Karola Maier, Vienna (AT); Mohamed Hassan, Vienna (AT); Alexander Kraus, Vienna (AT); Helmut Wenzel, Vienna (AT)

(73) Assignee: Viktor Maier, Vienna (AT)

( * ) Notice: Subject to any disclaimer, the term of this patent is extended or adjusted under 35 U.S.C. 154(b) by 656 days.

(21) Appl. No.: 12/448,901

(22) PCT Filed: Jan. 15, 2008
(Under 37 CFR 1.47)

(86) PCT No.: PCT/AT2008/000009
§ 371 (c)(1),
(2), (4) Date: Jun. 28, 2010

(87) PCT Pub. No.: WO2008/086551
PCT Pub. Date: Jul. 24, 2008

(65) Prior Publication Data
US 2010/0284130 A1  Nov. 11, 2010

(30) Foreign Application Priority Data

Jan. 15, 2007 (AT) .................................. A 72/2007
Feb. 6, 2007 (AT) .................................. A 193/2007

(51) Int. Cl.
*G01F 15/14* (2006.01)
(52) U.S. Cl.
USPC ....................................................... 73/432.1
(58) Field of Classification Search
USPC .................. 73/432.1, 866.5, 866.1, 775, 776; 156/273.9; 29/527.2, 527.3
See application file for complete search history.

(56) References Cited

U.S. PATENT DOCUMENTS

| 4,931,323 A | 6/1990 | Manitt et al. |
| 4,991,284 A | 2/1991 | Ezaki |

(Continued)

FOREIGN PATENT DOCUMENTS

| DE | 37 41 200 | 6/1988 |
| DE | 38 29 194 | 3/1990 |

(Continued)

OTHER PUBLICATIONS

International Search Report.

*Primary Examiner* — Peter Macchiarolo
*Assistant Examiner* — Tamiko Bellamy
(74) *Attorney, Agent, or Firm* — Collard & Roe, P.C.

(57) ABSTRACT

The invention relates to a method for producing a sensor system for monitoring elements (1), in particular supporting-structure elements, by measurement with at least one sensor (5) in thick-film technology, and with a line (8) for connection to a measurement system, wherein the at least one sensor (5) is comprised of at least one film of an electrically conductive paste (2), and wherein the paste (2) is baked. To create such a method, and such a sensor system, by means of which elements (1) that would not fit into a continuous furnace can be provided with sensors (5) using thick-film technology, it is provided that the at least one sensor (5) is arranged directly on the surface of the element (1) to be monitored by applying the at least one film of paste (2) directly to the surface of the element (1) to be monitored so as to form the at least one sensor (5), and optionally connection lines (8) and a field bus (6), and by baking the same directly on the element (1).

20 Claims, 4 Drawing Sheets

(56) References Cited

U.S. PATENT DOCUMENTS

| | | | |
|---|---|---|---|
| 5,186,051 A | | 2/1993 | Stecher et al. |
| 6,082,609 A | * | 7/2000 | Wienand et al. ........... 228/122.1 |
| 6,241,146 B1 | | 6/2001 | Wienand et al. |
| 6,476,377 B1 | | 11/2002 | Hodge |
| 6,972,687 B1 | | 12/2005 | Marshall et al. |
| 6,986,287 B1 | | 1/2006 | Dorfman |
| 2004/0004554 A1 | | 1/2004 | Srinivasan et al. |
| 2006/0253942 A1 | | 11/2006 | Barrera et al. |

FOREIGN PATENT DOCUMENTS

| | | |
|---|---|---|
| DE | 41 31 129 | 3/1993 |
| DE | 4131129 A1 * | 3/1993 |
| DE | 197 08 529 | 7/1998 |
| DE | 100 25 914 | 11/2001 |
| DE | 20 2004 004 766 | 6/2004 |
| EP | 0 972 288 | 1/2000 |
| EP | 1 524 404 | 4/2005 |
| WO | WO 93/25866 | 12/1993 |
| WO | WO 99/26256 | 5/1999 |

* cited by examiner

METHOD FOR PRODUCING A SENSOR SYSTEM, AND SENSOR SYSTEM

CROSS REFERENCE TO RELATED APPLICATIONS

This application is the National Stage of PCT/AT2008/000009 filed on Jan. 15, 2008, which claims priority under 35 U.S.C. §119 of Austrian Application No. A 72/2007 filed on Jan. 15, 2007 and Austrian Application No. A193/2007 filed on Feb. 6, 2007. The international application under PCT article 21(2) was not published in English.

The invention relates to a method for producing a sensor system for monitoring elements by measurement with at least one sensor in thick-film technology, and with a line for connection to a measurement system, wherein the at least one sensor is comprised of at least one film of an electrically conductive paste, and wherein the paste is baked.

Furthermore, the present invention relates to a sensor system for monitoring elements by measurement with at least one sensor in thick-film technology, and with a line for connection to a measurement system, wherein the at least one sensor is comprised of at least one film of a temperature-cured, electrically conductive paste.

The term "element" comprises in particular supporting elements, such as supporting-structure elements and supporting structures, e.g. of bridges.

In known thick-film technology, passive electronic components and conductor paths are applied to a substrate by means of so-called thick-film pastes by using a screen-printing process, and are baked in a continuous furnace.

For example, WO 99/26256 A1 describes a method for producing a sensor assembly in thick-film technology.

DE 41 31 129 describes a method for baking circuits in thick-film technology, and a device for conducting the method.

The known thick-film technology can only be used with substrates that fit into continuous furnaces. In case of too large a substrate, the thick-film sensor is applied indirectly by applying the paste, of which the sensor and/or the conductor path is made, to a smaller element and by baking the same. Then, this element is attached to the desired site of use by means of connection technology, e.g. adhesion.

Known sensors for monitoring elements, e.g. supporting structures of bridges, are attached to the elements after production, and supplied via a cabling and queried. To this end, some monitoring shafts are often provided. Known Sensors implemented in thick-film technology detect expansion, pressure, twisting, acceleration, humidity or the like, e.g.

These technologies exhibit the problems of external connections (corrosion, cable break, etc.), and their operation is very expensive so that they are used for permanent monitoring in the exceptional case only.

The object of the present invention resides in creating an above-mentioned method, and an above-mentioned sensor system, which allow for use of sensors also on elements larger than conventional continuous furnaces. The method, and sensor system, shall be as cheap as possible in use and production. The disadvantages of known methods and sensor systems shall be avoided or at least reduced.

In terms of method, the inventive object is achieved in that the at least one sensor is arranged directly on the surface of the element to be monitored by applying the at least one film of paste directly to the surface of the element so as to form the at least one sensor, and by baking the same directly on the element. The inventive method distinguishes itself in that the sensor is applied in thick-film technology not directly to a substrate but directly to the surface of the element to be monitored, e.g. a supporting-structure element, and is there baked directly by means of a mobile device for conducting the phases of the burn processes, i.e. a direct thick coating is achieved. Sensors produced by this direct thick coating can act inside of a structure, e.g., by being applied to the reinforcement of a concrete part, or asphalted on a sheet-metal strip into a road surface for oscillation measurement. The inventive method allows for a reduction of costs for monitoring by measurement. The thick-film sensors can be applied to the most different materials, e.g. metal, glass, stone or the like.

Advantageously, the connection line of the at least one sensor is also formed directly on the surface of the element to be monitored using thick-film technology. Thus, production of complex cabling to the sensors and the associated mechanical, and electrical, problems of the cabling can be avoided.

According to a further feature of the invention, several sensors are formed directly on the surface of the element to be monitored, and are interconnected via a field bus. In this manner, so-called sensor chains interconnected via the field bus can be implemented in thick-film technology. By the aid of such sensor chains, oscillations in elements, in particular supporting structures, can be detected. The use of a field bus for data communication allows for complex cabling to be omitted.

Preferably, the mentioned field bus is likewise formed directly on the surface of the element to be monitored using thick-film technology. This allows for production of elements with the sensors, the connection lines and the field bus by directly applied thick-film technology. The sensors, and optionally the connection lines and optionally the field bus, can be attached already during the production process of the respective element, thus considerably reducing costs.

To avoid that the sensors interconnected via the field bus carry address chips, an oscillator circuit with a different resonance frequency is formed in each sensor. In this manner, each signal can be assigned to the corresponding sensor by superimposing the measurement signal of the sensors with the respective resonance frequency of the sensor.

Preferably, the paste for forming the sensor, and optionally the connection lines and optionally the field bus, is baked directly on the element to be monitored by means of a mobile device. This mobile device replaces the continuous furnace usually used with thick-film technology.

Advantageously, the paste is baked with different temperature regions of up to about 900° C.

The paste may also be baked under protective-gas atmosphere. The protective-gas atmosphere may be formed by flushing nitrogen around the paste, e.g.

According to a further feature of the invention, it is provided that the paste is arranged for forming the at least one sensor, and optionally for forming the connection lines and optionally the field bus, on a matrix, and that the paste is transferred to the surface of the element to be monitored prior to the baking process by using the principle of a decal. In this manner, the thick-film elements can be pre-fabricated and transferred to the respective element prior to the baking process. Standardisation of such matrices shall ensure defined and reproducible paste properties.

To protect the thick-film elements against environmental influences, the at least one sensor, and optionally connection lines and the field bus, is (are) provided with a protective film.

The inventive object is also achieved by an above-mentioned sensor system, wherein the at least one sensor is arranged directly on the surface of the element to be monitored. As already mentioned above, this allows for reduction of the costs for monitoring by measurement, and for direct monitoring of the properties of the most different elements.

Preferably, the at least one connection line of the at least one sensor is likewise produced in thick-film technology, and arranged directly on the surface of the element to be monitored.

According to a further feature of the invention, several sensors may be arranged directly on the surface of the element to be monitored, and interconnected via a field bus. In this manner, segments, which include a group of sensors, or even sensor chains can be constructed.

Here, it is advantageous if also the field bus is produced in thick-film technology, and arranged directly on the surface of the element to be monitored.

To avoid address chips when connecting sensors with a common field bus, each sensor includes an oscillator circuit with a different resonance frequency for distinguishing the measurement signals.

If the at least one film of the non-cured paste is arranged for forming the non-cured paste is arranged for forming the at least one sensor, and optionally for forming connection lines and optionally the field bus, on a matrix, and if the paste is transferable to the surface of the element to be monitored by using the principle of a decal, a major part of the thick-film elements can be pre-fabricated and transferred to the surface of the element to be monitored only prior to the baking process.

The paste for forming the at least one sensor, and optionally the connection lines and optionally the field bus, may be comprised of an adhesive mixture. Metal-filled adhesive mixtures already allow conductive connections as a substitute for solderings. Dielectrics may likewise be realised by adhesive mixtures. In this respect, the adhesive mixtures do not only serve as a joining technique but also as a paste in the context of thick-film technology so as to allow for low coating temperatures. Because of these new adhesion applications not all of the known thick-film pastes are realisable in the form of adhesives yet.

Advantageously, the at least one sensor is designed for permanent monitoring.

If the at least one sensor is connected to an actuating means for forming a control circuit, in particular a permanent monitoring allows for simple and active responses to the sensor signals. In this manner, the element to be monitored may become an intelligent system in terms of control.

To protect the thick-film elements against environmental influences, a protective film may be provided above the at least one sensor, and optionally the connection lines and optionally the field bus.

Preferably, the sensors implemented in thick-film technology are designed for monitoring expansion, pressure, twisting, acceleration, temperature, humidity or the like.

For example, the at least one sensor, optionally along with the connection lines, and optionally along with the field bus, is (are) arranged directly on the surface of a supporting element, in particular a supporting structure or supporting-structure element.

The present invention will be explained in more detail by means of the figures enclosed. Therein:

Figure 1:
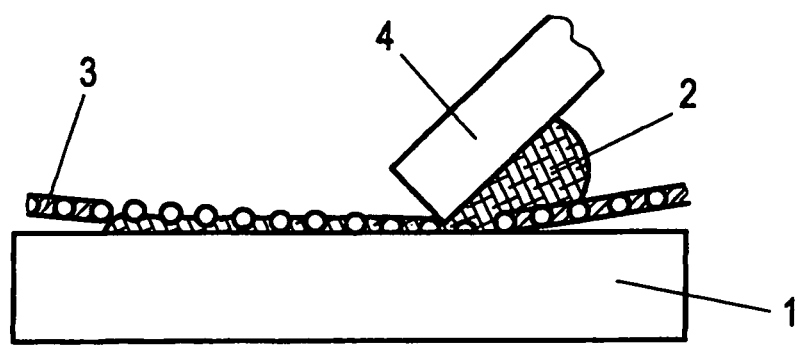
FIG. 1 shows a side view of an element during direct application of the paste in thick-film technology according to the screen-pressure process.

FIG. 1 shows the direct application of the thick-film paste 2 for producing a thick-film element on an element 1, e.g. a supporting-structure element or supporting structure, by screen-pressure technology. Accordingly, the paste 2 is applied directly to the element 1 by means of a doctor blade 4 and a photolitographically pretreated sieve 3. The paste 2 is applied in several films as a function of the component to be implemented. After each coating, the paste 2 is baked during a baking process. The element 1 is required to resist a baking temperature of about 800° C. A subsequent thermal pretreatment is possible for reformation of structural transformations. Sensors may be produced from the pastes 2 using thick-film technology, preferably for registration of expansion, pressure, twisting, acceleration, humidity or the like. Instead of using a screen-pressure process, the paste 2 may also be applied to the surface of the element 1 by an ink-jet process, e.g.

Figure 2:
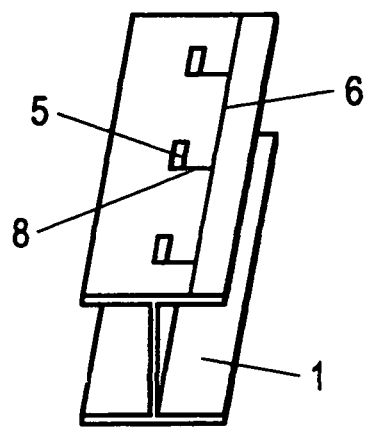
FIG. 2 shows a schematic representation of an I-beam which includes sensors applied in direct thick coating.

FIG. 2 schematically shows the use in case of an element 1 configured as an I-beam, wherein at the upper side of the element 1, individual sensors 5 are connected to a field bus 6 via connection lines 8. The individual sensors 5 of a PLC ("programmable logic controller") or PC card can be queried via the field bus 6, and at the same time be supplied with energy.

Figure 3:
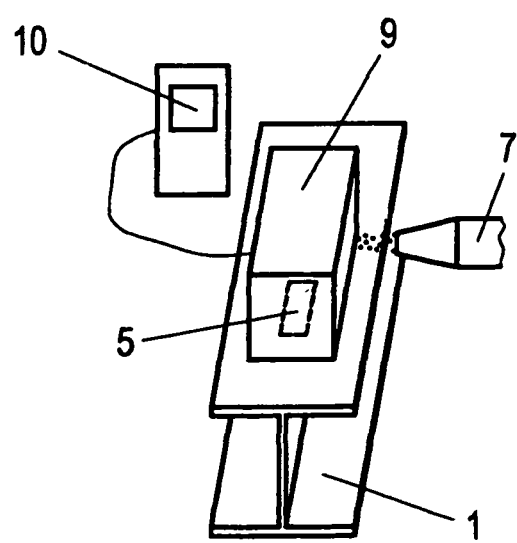
FIG. 3 shows the I-beam of FIG. 2 during the baking process.

In the basic outline of FIG. 3, a possible mobile device 9 is shown as a substitute for the continuous furnace. This mobile device 9 can be formed, e.g., by a copper block which acts as a so-called PT1 member and cools down with exponentially decreasing temperature course (PT1 member), which is maintained at baking temperature by means of a blow-dryer or burner 7. The temperature of the mobile device 9 can be controlled via a temperature-measurement device 10. Different temperature regions can be adjusted above the pastes 2 by cooling or changing/shifting the mobile device 9 for forming the sensor 5 and/or the connection lines 8 and the field bus 6. The paste 2 can be enclosed by nitrogen as a protective gas (not illustrated). Of course, the heat for the baking process can also be generated by all other known methods (electrically, via infra-red, etc.).

Instead of the I-beam illustrated in FIGS. 2 and 3, other profiles, e.g. rails, may of course be provided with the thick-film sensors 5.

Figure 4:
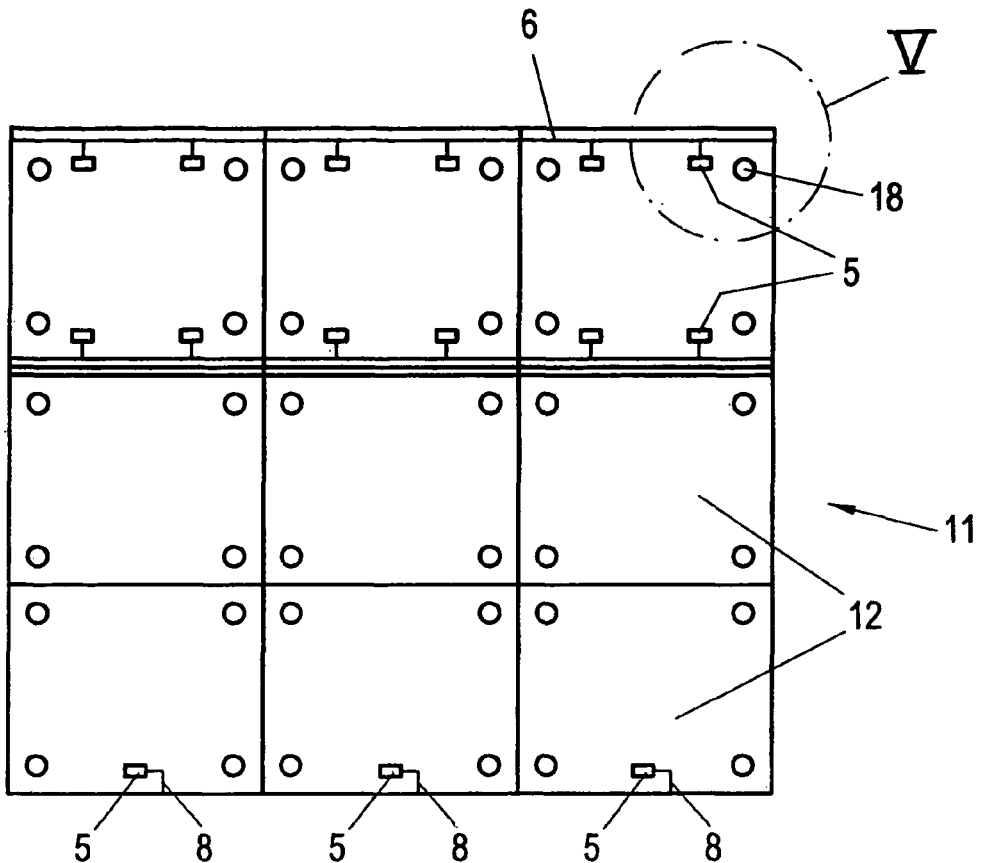
FIG. 4 shows a schematic representation of a part of a façade whose elements are provided with sensors applied in thick-film technology.

FIG. 4 shows a top view of a part of a façade 11 which may be formed by a number of façade elements 12, e.g. from glass. The façade elements 12 are mounted by appropriate fixing elements 13. In particular in the region of these fixing elements 13, sensors 5 may be applied to the surface of the façade elements 12 in thick-film technology, optionally along with the connection lines 8 and the field 6, and mechanical stress in the façade elements 12 is thus detected.

Figure 5:
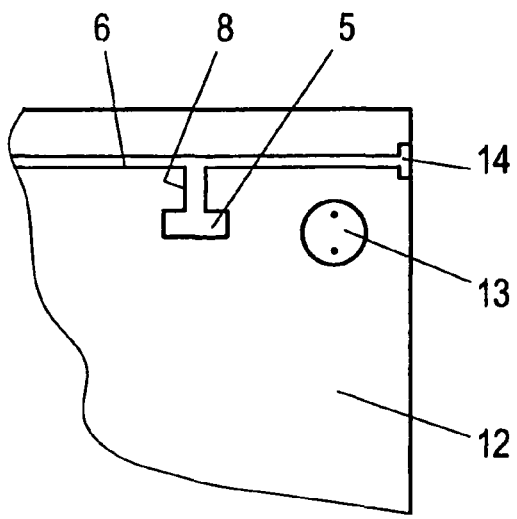
FIG. 5 shows detail V of FIG. 4 in an enlarged scale.

As is better illustrated in the detailed view of FIG. 5, the ends of the field bus 6 are provided with a connection 14 via which the respective measurement device, or a connection line to the measurement device (not illustrated), can be connected.

Figure 6:
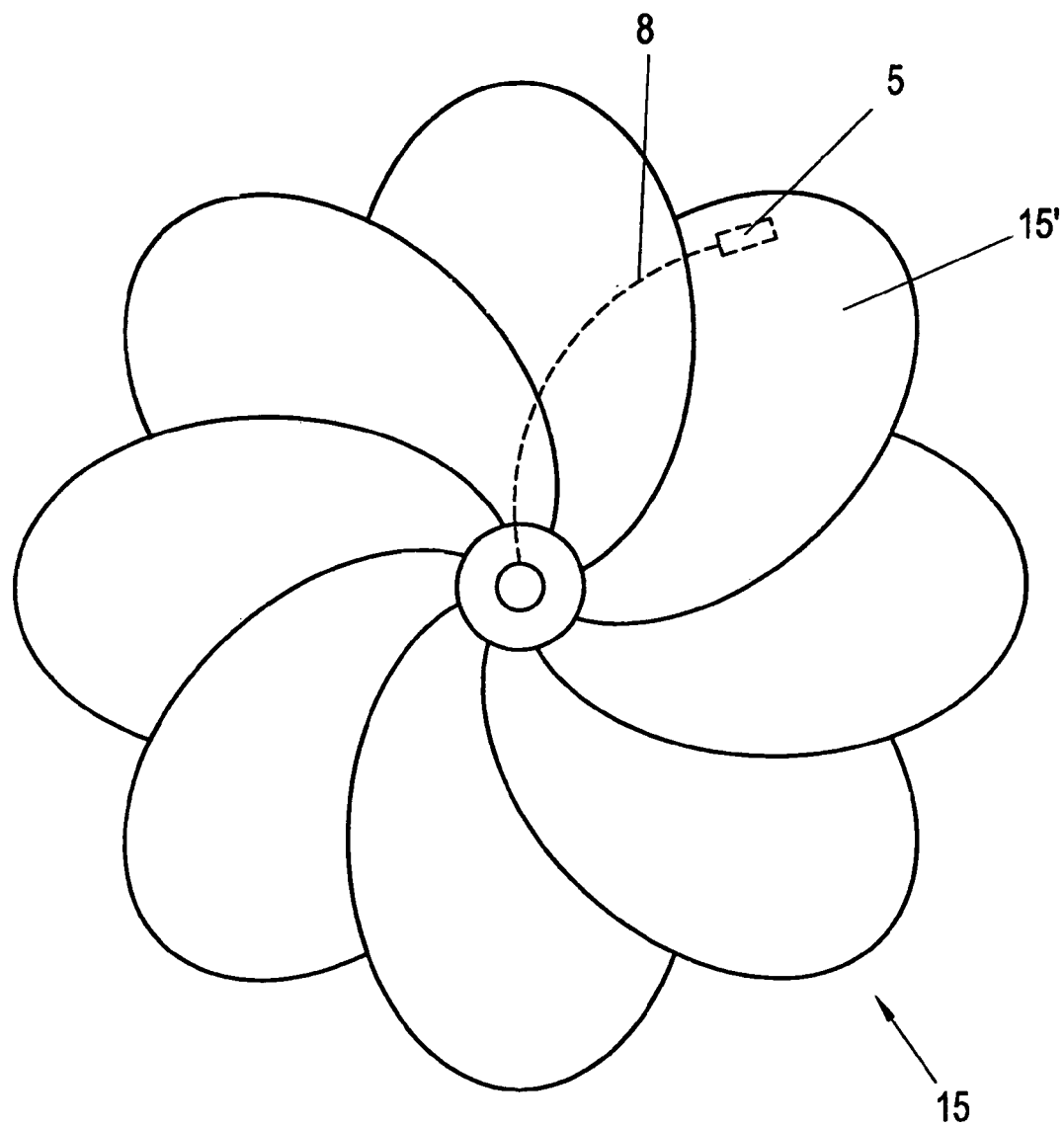
FIG. 6 shows a schematic representation of a turbine wheel which includes sensors arranged on a turbine blade in thick-film technology.

FIG. 6 shows a schematic top view of a turbine wheel 15, wherein a sensor 5 is arranged in thick-film technology together with a connection line 8 on a turbine blade 15'. In this manner, mechanical influences on the turbine blade 15' can be detected.

Figure 7:
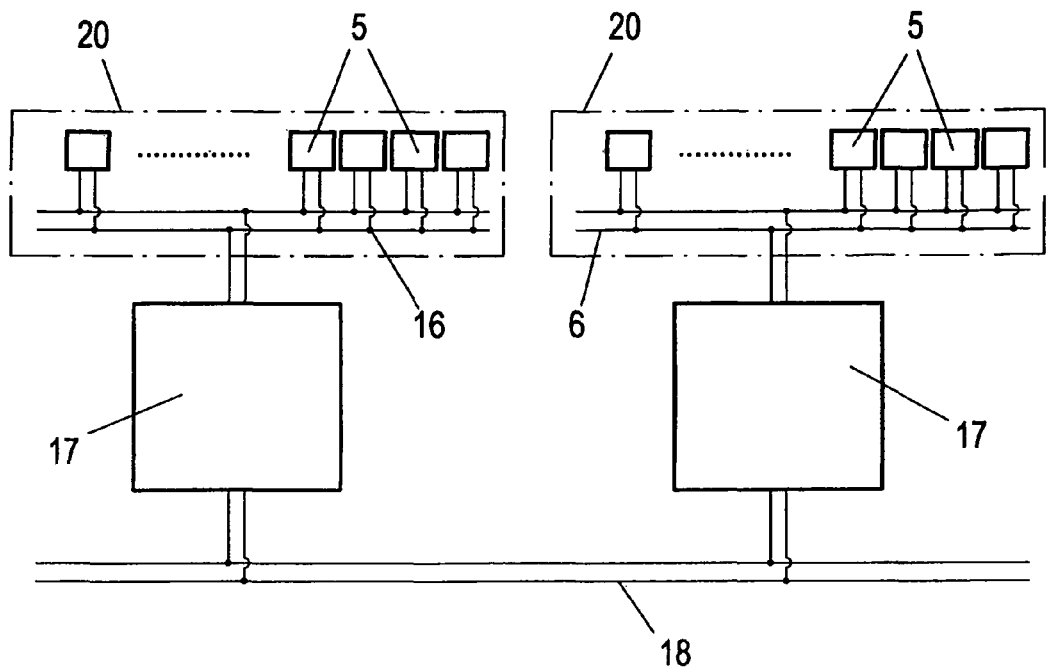
FIG. 7 shows a scheme of several sensors connected via a field bus (according to Mohamed Hassan)

According to FIG. 7, a group of sensors 5 is taken together to a segment 20 by connecting them directly to the field bus 6. To allow for a specific response of the sensors 5, they are each connected to an address chip according to the present state of the art. The method of Mohamed Hassan says that all sensors 5 additionally include an oscillator circuit with a resonance frequency that is characteristic for each sensor 5 and superimposes the measurement signal of the sensor 5. In this manner, the sensor signals can be assigned to the respective associated sensor 5 via the field bus 6. Direct connection of the sensors 5 without address chip allows for the field bus and the line node 16 to be continuously formed in thick-film technology. Preferably, the resonance frequencies of the oscillator circuit of the sensors 5 is in the kHz region so as to reduce line reflections which increase with frequency. The field bus 6 which may be formed by a two-wire line carries a sum signal of all sensors 5 of each segment 20 from which the signal of the respective sensor 5 is filtered in the field-bus node 17. The field-bus node 17 evaluates the analogue signal of the sensors 5 of a segment 20, digitises them and carries an own address. The field-bus node 17 can be connected to a conventional bus system 18, e.g. a CAN ("controller area network") bus or the like, via its address, and communicates with the bus control.

In case of certain elements 1, e.g. rails, it may also be used for transmitting signals so that the sensors 5 must be connected with only one line for implementing the field bus 6.

Figure 8:
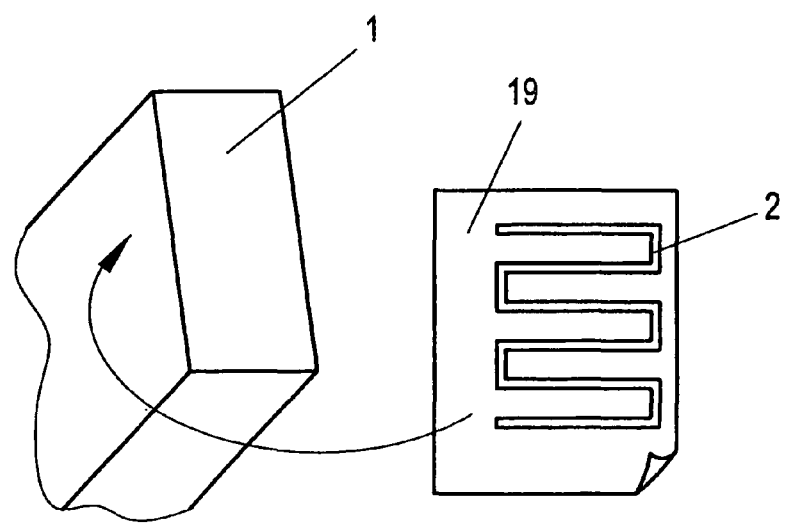
FIG. 8 shows a scheme for transferring a paste arranged on a matrix to the element to be monitored.

Finally, FIG. 8 shows an embodiment in which the paste 2 is applied to a matrix 19 for forming the sensors 5, and optionally the connection lines 8 and optionally the field bus 6. From this matrix 19, the paste 2 is applied to the surface of the element 1 by using the principle of a decal according to Mohamed Hassen, and will thereafter be baked. Standardisation of such matrices 19 shall ensure defined and reproducible paste properties.

Pretensioned-concrete elements of a bridge can be indicated as examples of further applications of the inventive method and/or inventive sensor system. In this context, the bias of the pretensioned-concrete elements is measured by means of the sensors applied in thick-film technology, and, for example, a readjustment is effected via the connection with appropriate actuating means.

An important application are so-called intelligent railway tracks, in particular track switches, where a permanent monitoring is desired at certain sites, e.g. tunnel junctions or bridge-line junctions. Continuously welded rails bear the risk of a rail detachment in case of inadmissibly high heat expansions. These heat expansions can be detected in time by means of sensors and using the inventive method.

Furthermore, ground dynamics, e.g. of a track superstructure, can be monitored by means of thick-film sensors. The ground dynamics is affected negatively by plant cover, and the movability of the ballast bed will be reduced, or freezable water will be stored, so that the ballast does not slide back again after track unloading.

The invention claimed is:

1. A method for producing a sensor system for monitoring elements by measurement with a plurality of sensors in thick-film technology, and with a line for connection to a measurement system, wherein each sensor comprises at least one film of an electrically conductive paste, and wherein the paste is baked, wherein several sensors are formed directly on the surface of the element to be monitored and interconnected via a field bus by applying the at least one film of paste directly to the surface of the element to be monitored so as to form each sensor, and by baking the same directly on the element.

2. The method according to claim 1, wherein the connection line of each sensor is formed directly on the surface of the element to be monitored using thick-film technology.

3. The method of claim 1, wherein the field bus is formed directly on the surface of the element to be monitored using thick-film technology.

4. The method according to claim 1, wherein an oscillator circuit with a different resonance frequency is formed in each sensor.

5. The method according to claim 1, wherein the paste is baked directly on the element to be monitored by means of a mobile device.

6. The method according to claim 1, wherein the paste is baked with different temperature regions of up to about 900° C.

7. The method according to claim 1, wherein the paste is baked under protective-gas atmosphere.

8. The method according to claim 1, wherein the paste is arranged for forming each sensor on a matrix, and wherein the paste is transferred to the surface of the element to be monitored by using the principle of a decal.

9. The method according to claim 1, wherein each sensor is provided with a protective film.

10. A sensor system for monitoring elements by measuring with a plurality of sensors in thick-film technology, and with a line for connection to a measurement system, wherein each sensor comprises at least one film of a temperature-cured, electrically conductive paste, wherein several sensors are arranged directly on the surface of the element to be monitored and are interconnected via a field bus.

11. The sensor system according to claim 10, wherein the at least one connection line is produced in thick-film technology, and arranged directly on the surface of the element to be monitored.

12. The sensor system according to claim 10, wherein the field bus is produced in thick-film technology, and arranged directly on the surface of the element to be monitored.

13. The sensor system according to claim 10, wherein each sensor includes an oscillator circuit with a different resonance frequency for distinguishing the measurement signals.

14. The sensor system according to claim 10, wherein the at least one film of the non-cured paste is arranged for forming each sensor on a matrix, and wherein the paste is transferable to the surface of the element to be monitored by using the principle of a decal.

15. The sensor according to claim 10, wherein the paste for forming each sensor comprises an adhesive mixture.

16. The sensor system according to claim 10, wherein each sensor is designed for permanent monitoring.

17. The sensor system according to claim 10, wherein each sensor is connected to an actuating means for forming a control circuit.

18. The sensor system according to claim 10, wherein a protective film is provided above each sensor (5).

19. The sensor system according to claim 10, wherein the sensors are designed for monitoring expansion, pressure, twisting, acceleration, temperature, or humidity.

20. The sensor system according to claim 10, wherein each sensor is arranged directly on the surface of a supporting element.

* * * * *

UNITED STATES PATENT AND TRADEMARK OFFICE
CERTIFICATE OF CORRECTION

PATENT NO. : 8,505,379 B2
APPLICATION NO. : 12/448901
DATED : August 13, 2013
INVENTOR(S) : Maier et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1006 days.

Signed and Sealed this
Fifteenth Day of September, 2015

Michelle K. Lee
*Director of the United States Patent and Trademark Office*